United States Patent [19]

Vassiliadis et al.

[11] Patent Number: 5,303,356
[45] Date of Patent: Apr. 12, 1994

[54] SYSTEM FOR ISSUING INSTRUCTIONS FOR PARALLEL EXECUTION SUBSEQUENT TO BRANCH INTO A GROUP OF MEMBER INSTRUCTIONS WITH COMPOUNDABILITY IN DICTATION TAG

[75] Inventors: Stamatis Vassiliadis, Vestal; Bartholomew Blaner, Newark Valley; Thomas L. Jeremiah, Endwell, all of N.Y.

[73] Assignee: International Business Machines Corporation, Armonk, N.Y.

[21] Appl. No.: 677,685

[22] Filed: Mar. 29, 1991

Related U.S. Application Data

[63] Continuation-in-part of Ser. No. 519,384, May 4, 1990, abandoned, and a continuation-in-part of Ser. No. 543,458, Jun. 26, 1990, Pat. No. 5,197,135, and a continuation-in-part of Ser. No. 642,011, Jan. 15, 1991, and a continuation-in-part of Ser. No. 519,382, May 4, 1990, abandoned.

[51] Int. Cl.$^5$ .............................................. G06F 9/38
[52] U.S. Cl. .................... 395/375; 364/261.3; 364/948.3; 364/938; 364/DIG. 1; 395/800
[58] Field of Search ........................ 395/375, 800

[56] References Cited

U.S. PATENT DOCUMENTS

| | | |
|---|---|---|
| 4,295,193 | 10/1981 | Pomerene . |
| 4,439,828 | 3/1984 | Martin . |
| 4,574,348 | 3/1986 | Scallon . |
| 4,586,127 | 4/1986 | Horvath . |
| 4,594,655 | 6/1986 | Hao et al. . |
| 4,755,966 | 7/1988 | Lee et al. . |
| 4,760,520 | 7/1988 | Shintani et al. . |
| 4,780,820 | 10/1988 | Sowa . |
| 4,807,115 | 2/1989 | Torng . |
| 4,847,755 | 7/1989 | Morrison et al. . |
| 4,942,525 | 7/1990 | Shintani et al. . |
| 5,075,844 | 12/1991 | Jardine et al. ............ 395/375 |
| 5,203,002 | 4/1993 | Wetzel ..................... 395/800 |
| 5,237,666 | 8/1992 | Suzuki et al. ............ 395/375 |

OTHER PUBLICATIONS

Acosta, R. D., et al, "An Instruction Issuing Approach to Enhancing Performance in Multiple Functional Unit Processors", IEEE Transactions on Computers, Fall, C-35 No. 9, Sep. 1986, pp. 815-828.

Anderson, V. W., et al., the IBM System/360 Model 91: "Machine Philosophy and Instruction Handling", computer structures: Principles and Examples (Siewiorek, et al., ed (McGraw-Hill, 1982, pp. 276-292)).

Capozzi, A. J., et al., "Non-Sequential High-Performance Processing" IBM Technical Disclosure Bulletin, vol. 27, No. 5, Oct. 1984, pp. 2842-2844.

Chan, S., et al., "Building Parallelism into the Instruction Pipeline", High Performance Systems, Dec., 1989, pp. 53-60.

(List continued on next page.)

Primary Examiner—Robert B. Harrell
Assistant Examiner—Ken S. Kim
Attorney, Agent, or Firm—Lynn L. Augspurger

[57] ABSTRACT

An instruction processor system for decoding compound instructions created from a series of base instructions of a scalar machine, the processor generating a series of compound instructions with an instruction format text having appended control bits in the instruction format text enabling the execution of the compound instruction format text in said instruction processor with a compounding facility which fetches and decodes compound instructions which can be executed as compounded and single instructions by the arithmetic and logic units of the instruction processor while preserving intact the scalar execution of the base instructions of a scalar machine which were originally in storage. The system nullifies any execution of a member instruction unit of a compound instruction upon occurrence of possible conditions, such as branch, which would affect the correctness of recording results of execution of the member instruction unit portion based upon the interrelationship of member units of the compound instruction with other instructions. The resultant series of compounded instructions generally executes in a faster manner than the original format which is preserved due to the parallel nature of the compounded instruction stream which is executed.

13 Claims, 8 Drawing Sheets

B = BRANCH INSTRUCTION

OTHER PUBLICATIONS

Murakami, K., et al., "SIMP (Single Instruction Stream/Multiple Instruction Pipelining); A Novel High-Speed Single Processor Architecture", Proceedings of the Sixteenth Annual Symposium on Computer Architecture, 1989, pp. 78-85.

Smith, J. E., "Dynamic Instructions Scheduling and the Astronautics ZS-1", IEEE Computer, Jul., 1989, pp. 21-35.

Smith, M. D., et al., "Limits on Multiple Instruction Issue", Asplos III, 1989, pp. 290-302.

Tomasulo, R. M., "An Efficient Algorithm for Exploiting Multiple Arithmetic Units", Computer Structures, Principles, and Examples (Siewiorek, et al. ed), McGraw-Hill, 1982, pp. 293-302.

Wulf, P. S., "The WM Computer Architecture", Computer Architecture News, vol. 16, No. 1, Mar. 1988, pp. 70-84.

Jouppi, N. P., et al., "Available Instruction-Level Parallelism for Superscalar Pipelined Machines", ASPLOS III, 1989, pp. 272-282.

Jouppi, n.P., "The Non-Uniform Distribution of Instruction-Level and Machine Parallelism and its Effect on Performance", IEEE Transactions on Computers, vol. 38, No. 12, Dec., 1989, pp. 1645-1658.

Ryan, D. E., "Entails 80960: An Architecture Optimized for Embedded Control", IEEE Microcomputers, vol. 8, No. 3, Jun. 1988, pp. 63-76.

Colwell, R. P., et al., "A VLIW Architecture for a Trace Scheduling Compiler", IEEE Transactions on Computers, vol. 37, No. 8, Aug., 1988, pp. 967-979.

Fisher, J. A., "The Vliw Machine: A Multi-Processor for Compiling Scientific Code", IEEE Computer, Jul., 1984, pp. 45-53.

Berenbaum, A. D., "Introduction to the Crisp Instruction Set Architecture", Proceedings of Compcon, Spring, 1987, pp. 86-89.

Bandyopadhyay, S., et al., "Compiling for the Crisp Microprocessor", Proceedings of Compcon, Spring, 1987, pp. 96-100.

Hennessy, J., et al., "MIPS: A VSI Processor Architecture", Proceedings of the CMU Conference on VLSI Systems and Computations, 1981, pp. 337-346.

Patterson, E. A., "Reduced Instruction Set Computers", Communications of the ACM, vol. 28, No. 1, Jan., 1985, pp. 8-21.

Radin, G., "The 801 Mini-Computer", IBM Journal of Research and Development, vol. 27, No. 3, May, 1983, pp. 237-246.

Ditzel, D. R., et al., "Branch Folding in the Crisp Microprocessor: Reducing Branch Delay to Zero", Proceedings of Compcon, Spring 1987, pp. 2-9.

Hwu, W. W., et al., "Checkpoint Repair for High-Performance Out-of-Order Execution Machines", IEEE Transactions on Computers vol. C36, No. 12, Dec., 1987, pp. 1496-1594.

Lee, J. K. F., et al., "Branch Prediction Strategies in Branch Target Buffer Design", IEEE Computer, vol. 17, No. 1. Jan. 1984, pp. 6-22.

Riseman, E. M., "The Inhibition of Potential Parallelism by Conditional Jumps", IEEE Transactions on Computers, Dec., 1972, pp. 1405-1411.

Smith, J. E., "A Study of Branch Prediction Strategies", IEEE Proceedings of the Eight Annual Symposium on Computer Architecture, May 1981, pp. 135-148.

Archibold, James, et al., Cache Coherence Protocols: "Evaluation Using a Multiprocessor Simulation Model", ACM Transactions on Computer Systems, vol. 4, No. 4, Nov. 1986, pp. 273-398.

Baer, J. L., et al. "Multi-Level Cache Hierarchies: Organizations, Protocols, and Performance" Journal of Parallel and Distributed Computing vol. 6, 1989, pp. 451-476.

Smith, A. J., "Cache Memories", Computing Surveys, vol. 14, No. 3 Sep., 1982, pp. 473-530.

Smith, J. E., et al., "A Study of Instruction Cache Organizations and Replacement Policies", IEEE Proceedings of the Tenth Annual International Symposium on Computer Architecture, Jun. 1983, pp. 132-137.

Vassiliadis, S., et al., "Condition Code Predictory for Fixed-Arithmetic Units", International Journal of Electronics, vol. 66, No. 6, 1989, pp. 887-890.

Tucker, S. G., "The IBM 3090 System: An Overview", IBM Systems Journal, vol. 25, No. 1, 1986, pp. 4-19.

IBM Publication No. SA22-7200-0, Principles of Operation, IBM Enterprise Systems Architecture/370, 1988.

The Architecture of Pipelined Computers, by Peter M. Kogge Hemisphere Publishing Corporation, 1981.

IBM Technical Disclosure Bulletin (vol. 33 No. 10A, Mar. 1991), by R. J. Eberhard "Early Release of a Processor Following Address Translation Prior to Page Access Checking".

B = BRANCH INSTRUCTION

SYSTEM FOR ISSUING INSTRUCTIONS FOR PARALLEL EXECUTION SUBSEQUENT TO BRANCH INTO A GROUP OF MEMBER INSTRUCTIONS WITH COMPOUNDABILITY IN DICTATION TAG

CROSS REFERENCE TO RELATED APPLICATIONS

This application claims priority and U.S.A. continuation-in-part status continuing U.S. Ser. No. 07/519,384, filed May 4, 1990, now abandoned, U.S. Ser. No. 07/543,458, filed Jun. 26, 1990, now issued U.S. Pat. No. 5,197,135, and U.S. Ser. No. 07/642,011, filed Jan. 15, 1991, and U.S. Ser. No. 07/519,382, filed May 4, 1990, now abandoned.

The present U.S. patent application is related to the following co-pending U.S. patent applications:

(1) Application Ser. No. 07/519,384, filed May 4, 1990, now abandoned, entitled "Scalable Compound Instruction Set Machine Architecture", the inventors being Stamatis Vassiliadis et al; and (2) Application Ser. No. 07/519,382, filed May 4, 1990, now abandoned, entitled "General Purpose Compounding Technique For Instruction-Level Parallel Processors", the inventors being Richard J. Eickemeyer et al; and (3) Application Ser. No. 07/504,910, filed Apr. 4, 1990, now issued U.S. Pat. No. 5,051,940, entitled "Data Dependency Collapsing Hardware Apparatus", the inventors being Stamatis Vassiliadis et al; and (4) Application Ser. No. 07/522,291, filed May 10, 1990, now issued U.S. Pat. No. 5,214,763 entitled "Compounding Preprocessor For Cache", the inventors being Bartholomew Blaner et al; and (5) Application Ser. No. 07/543,464, filed Jun. 26, 1990, now abandoned, entitled "An In-Memory Preprocessor for a Scalable Compound Instruction Set Machine Processor", the inventors being Richard Eickemeyer et al; and (6) Application Ser. No. 07/543,458, filed Jun. 26, 1990, now issued U.S. Pat. No. 5,197,135, entitled "Memory Management for Scalable Compound Instruction Set Machines With In-Memory Compounding", the inventors being Richard J. Eickemeyer et al; and (7) Application Ser. No. 07/619,868, filed Nov. 28, 1990, entitled "Overflow Determination for Three-Operand ALUS in a Scalable Compound Instruction Set Machine", the inventors being Stamatis Vassiliadis et al; and (8) Application Ser. No. 07/642,011, filed Jan. 15, 1991, entitled "Compounding Preprocessor for Cache", the inventors being Bartholomew Blaner et al.

These co-pending applications and the present application are owned by one and the same assignee, namely, International Business Machines Corporation of Armonk, N.Y.

The descriptions set forth in these co-pending applications are hereby incorporated into the present application by this reference thereto.

A review of these related cases will show that we have illustrated FIGS. 1–2 in U.S. Ser. No. 07/519,384 filed May 4, 1990, while FIG. 3 may also be found described in U.S. Ser. No. 07/543,458 filed Jun. 26, 1990, and FIG. 4-B has been generally described in U.S. Ser. No. 07/642,011 filed Jan. 15, 1991, while FIGS. 5-7 were also illustrated in U.S. Ser. No. 07/591,382 filed May 4, 1990.

FIELD OF THE INVENTION

This invention relates to digital computers and digital data processors, and particularly to digital computers and data processors capable of executing two or more instructions in parallel, and provides a mechanism for branching in the middle of a compound instruction. Particularly also, the system thus provided enables a set of instructions which may be combined into compound instructions to be statically determined, and allows the appending of control information to the instructions in the program to be executed with branching in the middle of a compound instruction enabled.

BACKGROUND OF THE INVENTION

Traditional computers which receive a sequence of instructions and execute the sequence one instruction at a time are known, and are referred to as "scalar" computers. With each new generation of computing machines, new acceleration mechanism must be discovered for traditional scalar machines. A recent mechanism for accelerating computational speed is found in reduced instruction set architecture (RISC) that employs a limited set of very simple instructions executing at a high rate of speed. Alternatively, another acceleration mechanism may be to add more complex instructions to the architecture to provide more computation function per instruction and thus reduce the number of instructions in a program. Application of either of these approaches to an existing scalar computer would require a fundamental alteration of the instruction set and architecture of the machine. Such a far-reaching transformation is fraught with expense, down-time, and an initial reduction in the machine's reliability and availability.

Recently, "superscalar" computers have been developed which further accelerate computation speed. These machines are essentially scalar machines whose performance is increased by adapting them to execute more than one instruction at a time from an instruction stream including a sequence of single scalar instructions. These machines typically decide at instruction execution time whether two or more instructions in a sequence of scalar instructions may be executed in parallel. The decision is based upon the operation codes (OP codes) of the instructions and on data dependencies which may exist between instructions. An OP code signifies the computational hardware required for an instruction. In general, it is not possible to concurrently execute two or more instructions which utilize the same hardware (a hardware dependency) or the same operand (a data dependency). These hardware and data dependencies prevent the parallel execution of some instruction combinations. In these cases, the affected instructions are executed serially. This, of course, reduces the performance of a superscalar machine.

Superscalar computers suffer from disadvantages which it is desirable to minimize. A concrete amount of time is consumed in deciding at instruction execution time which instructions can be executed in parallel. This time cannot be readily masked by overlapping with other machine operations. This disadvantage becomes more pronounced as the complexity of the instruction set architecture increases. Also, the parallel execution decision must be repeated each time the same instructions are to be executed.

In extending the useful lifetime of existing scalar computers, every means of accelerating execution is vital. However, acceleration by means of reduced instruction set architecture, complex instruction set architecture, or traditional superscalar techniques is potentially too costly or too disadvantageous to consider for an existing scalar machine.

It would be preferred to accelerate the speed of execution of such a computer by parallel, or concurrent, execution of instructions in an existing instruction set without requiring change of the instruction set, change of machine architecture, or extension of the time required for instruction execution.

SUMMARY OF THE INVENTION

It is to this object that the inventions which are here stated are addressed as a system which enables original programs to be processed as parallel and single instructions as fits the original program functions which are implemented for execution by a machine capable of instruction-level parallel processing. We have provided a way for existing programs written in existing high level languages or existing assembly language programs to be processed by a preprocessor which can identify sequences of instructions which can be executed as a single compound instruction in a computer designed to execute compound instructions.

The instruction processor system provides compounding decoding for a series of base instructions of a scalar machine, generates a series of compound instructions, provides for fetching of the compound instructions and for decoding the fetched compound instructions and necessary single instructions, and provides a compound instruction program which preserves intact the scalar execution of the base instructions of a scalar machine when the program with compound instructions is executed on the system. This system also provides a mechanism for branching in the middle of a compounding instruction. For branching in the middle of a compound instruction, compound instructions are examined for appended control bits and a nullification mechanism responsive to the control bits is provided for nullifying the execution of member units of the branched-to or subsequent compound instructions if their execution would cause incorrect program behavior.

The instruction processor system of the inventions described herein provides decoding of compound instructions created from a series of base instructions of a scalar machine, the processor generating a series of compound instructions with instruction text having appended control bits enabling the execution of the compound instruction in said instruction processor with a compounding facility which is provided in the system. The system fetches and decodes compound instructions which can be executed as compounded and single instructions by the functional instruction units of the instruction processor while preserving intact the scalar execution of the base instructions of a scalar machine which were originally in storage. The resultant series of compounded instructions generally executes in a faster manner than the original format due to the parallel nature of the compounded instruction stream which is executed.

For a better understanding of the invention, together with its advantages and features, reference be had to the co-pending applications for some detailed background. Further, specifically as to the improvements described herein reference should be made to the following description and the below-described drawings.

BRIEF DESCRIPTION OF THE DRAWINGS

FIG. 6 is a flow diagram showing generation of a compound instruction set program from an assembly language program; while

DETAILED DESCRIPTION OF THE PREFERRED EMBODIMENT

Background

Figure 1:
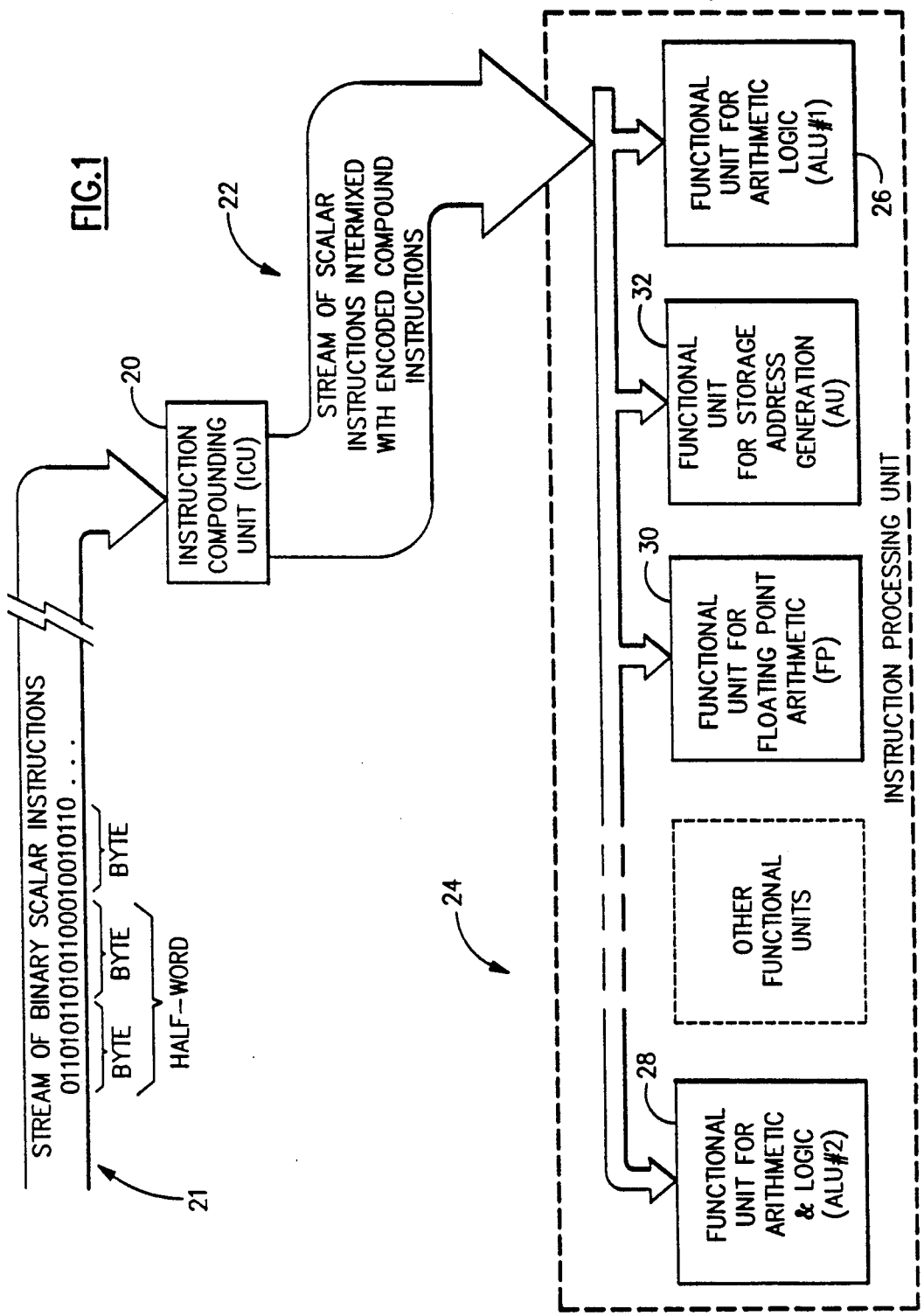
FIG. 1 is a high-level schematic diagram of a computing system which is capable of compounding instructions in a sequence of scalar instructions for concurrent execution.

In co-pending patent application Ser. No. 07/519,382, a scalable compound instruction set machine (SCISM) architecture method is proposed in which instruction level parallelism is achieved by statically analyzing a sequence of scalar instruction at a time prior to instruction execution to generate compound instructions formed by grouping adjacent instructions in a sequence which are capable of parallel execution. That system is also disclosed here. Relevant control information in the form of compounding tags is added to the instruction stream to indicate where a compound instruction starts, as well as to indicate the number of instructions which are incorporated into a compound instruction. Relatedly, when used herein, the term "compounding" refers to the grouping of instructions contained in a sequence of instructions, the grouping being for the purpose of concurrent or parallel execution of the grouped instructions. At minimum, compounding is satisfied by "pairing" of two instructions for simultaneous execution. Preferably, compounded instructions are unaltered from the forms they have when presented for scalar execution.

In a digital computer system which includes a means for executing a plurality of instructions in parallel, a particularly advantageous embodiment of the invention of this application is based upon a memory architecture which provides for compounding of instructions prior to their issue and execution. This memory structure provides instructions to the CPU (central processing unit) of a computer. Typically, a hierarchical memory structure includes a high-speed cache storage containing currently accessed instructions, a medium speed main memory connected to the cache, and a low-speed, high-capacity auxiliary storage. Typically, the cache and main storage (referred to collectively as "real storage") contain instructions which can be directly referenced for execution. Access to instructions in the auxiliary storage is had through an input/output (I/O) adaptor connected between the main memory and the auxiliary storage.

In co-pending patent application Ser. No. 07/543,464, an in-memory preprocessor for a SCISM architecture is proposed in which an instruction compounding mechanism in real storage produces compounding tag information for a sequence of scalar instructions, the compounding tag information indicating instructions of the sequence which may be executed in parallel. The instruction compounding unit produces the compounding tag information as a page of instructions is being prefetched and stored in the main memory. Although the particular embodiment of that patent application teaches compounding of up to two instructions, it is contemplated that up to N instructions may be compounded for concurrent execution in a scalar computer.

In patent application Ser. No. 07/522,219, a compounding preprocessor for a cache in a hierarchical memory is disclosed in which the instruction compounding unit is located between the main memory and cache of a hierarchical storage organization. The instruction compounding unit produces compounding tag information for the instructions in a line of instructions being fetched into the cache from the main memory.

In these applications, instructions in a cache have accompanying compounding tags to which a plurality of parallel execution units respond by executing one or more of the instructions in a group of up to N instructions in parallel. In these related systems, including U.S. Ser. No. 07/543,458 filed Jul. 26, 1990, a MEMORY MANAGEMENT FOR SCALABLE COMPOUND INSTRUCTION SET MACHINES WITH IN-MEMORY COMPOUNDING as disclosed, by R. J. Eickemeyer et al, there is proposed in the context of a computer system capable of concurrently executing up to N instructions in a sequence of scalar instructions, the sequence including compounding tags which accompany the set of ordered scalar instructions and which are activated to indicate the instructions which are to be concurrently executed. There is a mechanism for managing the compounding tags of scalar instructions which are stored in the real storage of the computer system, and it includes a merging unit connected to the real memory for merging a modified instruction from the real memory with non-modified instructions in the real memory. A tag reduction unit connected to the merging unit and to the real memory deactivates the compounding tags of the modified instruction and N-1 instructions in the real memory with which the modified instruction could be compounded.

However, in all of these developments there is an unfulfilled need to determine in the processing of a set of instructions or program to be executed by a computer exactly which instructions may be combined into compound instructions, and in what manner there shall be accomplished the appending of control information to the instructions in the program to be executed. This need is addressed by the disclosure of U.S. Ser. No. 07/522,219, and U.S. Ser. No. 07/642,011.

Overview

Referring to FIG. 1 of the drawings, there is shown a representative embodiment of a portion of a digital computer system for a digital data processing system constructed in accordance with the present invention. This computer system is capable of executing two or more instructions in parallel. In order to support the concurrent execution of a group of two or more instructions, the computer system includes a plurality of functional units which operate in parallel in a concurrent manner; each on its own, is capable of processing one or more types of machine-level instructions. The system includes the capability of compounding instructions for parallel or concurrent execution. In this regard, "compounding" refers to the grouping of a plurality of instructions in a sequence of scalar instructions, wherein the size of the grouping is scalable from 1 to N. The sequence of scalar instructions could, for example, be drawn from an existing set of scalar instructions such as that used by the IBM System/370 products. However, it is understood that compounding is intended to facilitate the parallel issue and execution of instructions in all computer architectures that can be adapted to process multiple instructions per cycle.

When an instruction stream is compounded, adjacent scalar instructions are selectively grouped for the purpose of concurrent or parallel execution. In general, an instruction compounding facility will look for classes of instructions that may be executed in parallel. When compatible sequences of instructions are found, a compound instruction is created.

Compounding techniques have been discussed in other applications. Reference is given to patent application Ser. No. 07/519,384 (IBM Docket EN9-90-020), filed May 4, 1990, and U.S. patent application Ser. No. 07/519,382 entitled GENERAL PURPOSE COMPOUNDING TECHNIQUE FOR INSTRUCTION-LEVEL PARALLEL PROCESSORS, filed May 4, 1990, for an understanding of compounding generally. An illustration of an instruction compounding unit for pairwise compounding is given in U.S. patent application Ser. No. 07/543,464, filed Jun. 26, 1990.

Instruction Compounding and Execution

As is generally shown in FIG. 1, an instruction compounding unit 20 takes a stream of binary scalar instructions 21 and selectively groups some of the adjacent scalar instructions to form encoded compound instructions. A resulting compounded instruction stream 22, therefore, provides scalar instructions to be executed singly or in compound instructions formed by groups of scalar instructions to be executed in parallel. When a scalar instruction is presented to an instruction processing unit 24, it is routed to the appropriate one of a plurality of execution units for serial execution. When a compound instruction is presented to the instruction processing unit 24, its scalar components are each routed to an appropriate execution unit for simultaneous parallel execution. Typical functional units include, but are not limited to, an arithmetic logic unit (ALU) 26, 28 a floating point arithmetic unit (FP) 30 and a storage address generation unit (AU) 32.

Figure 2:
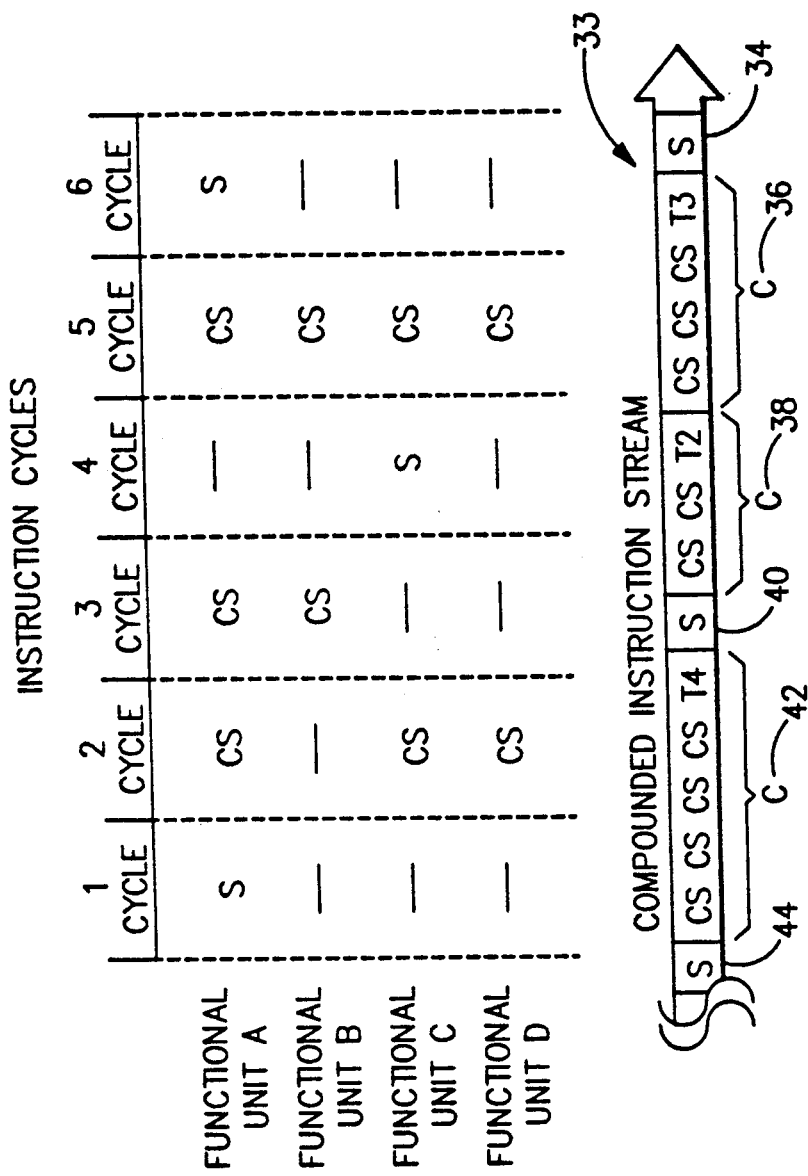
FIG. 2 is a timing diagram for a uni-processor implementation showing the parallel execution of certain instructions which have been selectively grouped in a compound instruction stream.

Referring now to FIG. 2, compounding can be implemented in a uniprocessor environment where each functional unit executes a scalar instruction (S) or, alternatively, a compound instruction (CS). As shown in the drawing, an instruction stream 33 containing a sequence of scalar and compounded scalar instructions has control bits or tags (T) associated with each compound instruction. Thus, a first scalar instruction 34 could be executed singly by functional unit A in cycle 1; a triplet compound instruction 36 identified by tag T3 could have its 3 compounded scalar instructions executed in parallel by functional units A, C, and D in cycle 2; another compound instruction 38 identified by tag T2 could have its pair of compounded scalar instructions executed in parallel by functional units A and B in cycle 3; a second scalar instruction 40 could be executed singly by functional unit C in cycle 4; a large group compound instruction 42 could have its 4 compounded scalar instructions executed in parallel by functional units A–D in cycle 5; and a third scalar instruction 44 could be executed singly by functional unit A in cycle 6.

One example of a computer architecture which can be adapted for handling compound instructions is an IBM System/370 instruction level architecture in which multiple scalar instructions can be issued for execution in each machine cycle, in accordance with FIG. 2. In this context, a machine cycle refers to a single pipeline stage required to execute a scalar instruction.

Generally, it is useful to provide for compounding at a time prior to instruction issue so that the process can be done once for an instruction or instructions that may be executed many times. It has been proposed to locate the instruction compounding functions in the real memory of a computer system in order to implement compounding in hardware, after compile time, yet prior to instruction issue. Such compounding is considered to be a preferred alternative to other alternatives described herein and referred to as "in-memory compounding" which can be illustrated with reference to U.S. patent application Ser. No. 07/522,219, filed May 10, 1990, and U.S. patent application Ser. No. 07/543,464, filed Jun. 26, 1990, and FIG. 3 hereof. Memory management, as described herein by way of background, is also described in U.S. patent application Ser. No. 07/543,458 entitled MEMORY MANAGEMENT FOR SCALABLE COMPOUND INSTRUCTION SET MACHINES WITH IN-MEMORY COMPOUNDING, filed Jun. 26, 1990.

Figure 3:
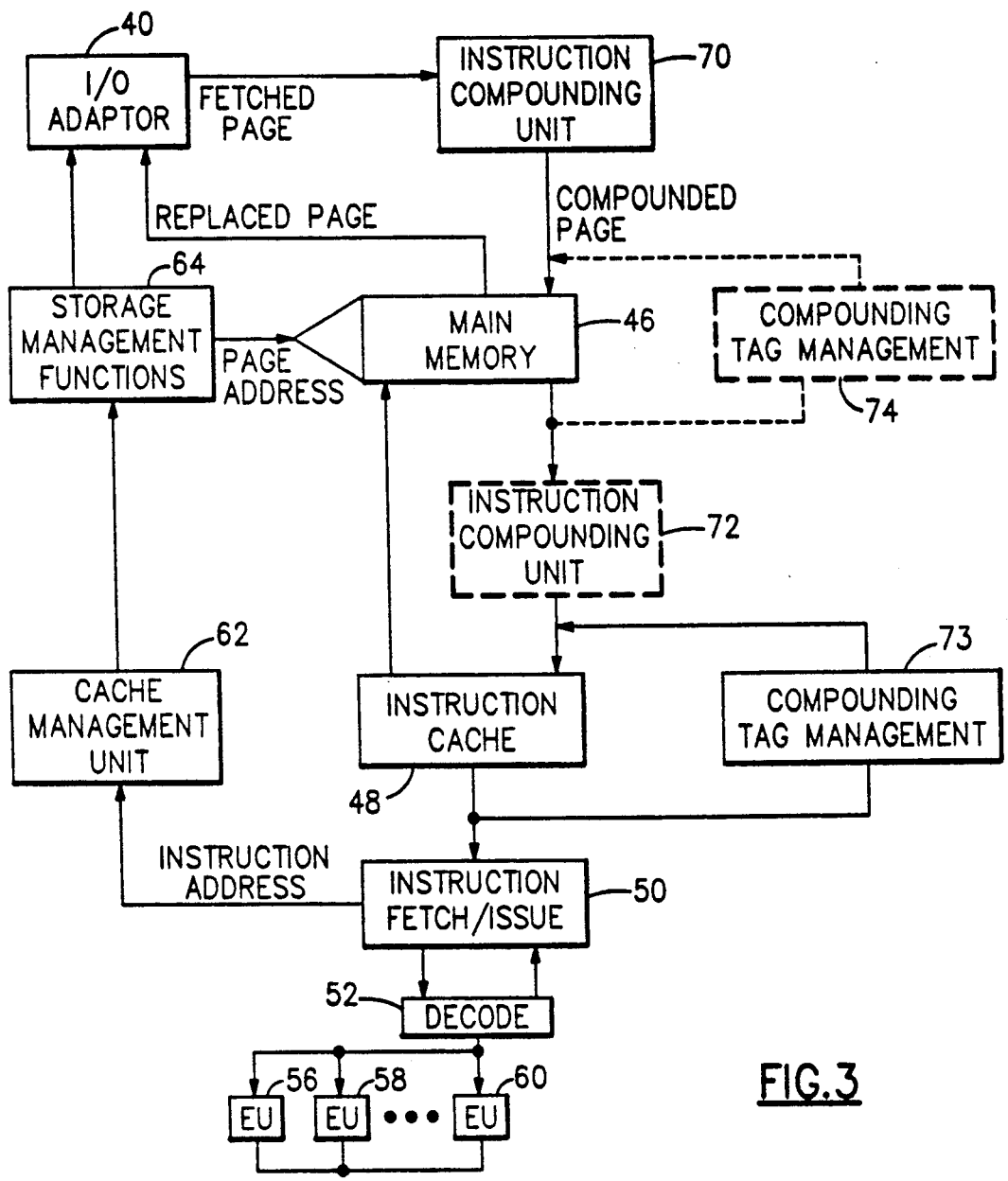
FIG. 3 is a block diagram of a hierarchical memory organization in a scalable compound instruction set machine with in-memory processing shown as an alternative preferred embodiment for the operational environment.

Generally, in-memory compounding is illustrated in FIG. 3. In FIG. 3, a hierarchical memory organization includes an I/O adaptor 40 which interfaces with auxiliary storage devices and with a computer real memory. The real memory of the organization includes a medium speed, relatively high capacity main memory 46 and a high-speed, relatively low capacity instruction cache 48. (The main memory and cache collectively are referred to herein as "real memory", "real storage", or, simply "memory".) A stream of instructions is brought in from auxiliary storage devices by way of the I/O adaptor 40, and stored in blocks called "pages" in the main memory 46. Sets of contiguous instructions called "lines" are moved from the main memory 46 to the instruction cache 48 where they are available for high-speed reference for processing by the instruction fetch and issue unit 50. Instructions which are fetched from the cache are issued, decoded at 52, and passed to the functional units 56, 58, ..., 60 for execution.

During execution when reference is made to an instruction which is in the program, the instruction's address is provided to a cache management unit 62 which uses the address to fetch one or more instructions, including the addressed instruction, from the instruction cache 48 into the queue in the unit 50. If the addressed instruction is in the cache, a cache "hit" occurs. Otherwise, a cache "miss" occurs. A cache miss will cause the cache management unit 62 to send the line address of the requested instruction to a group of storage management functions 64. These functions can include, for example, real storage management functions which use the line address provided by the cache management unit 62 to determine whether the page containing the addressed line is in the main memory 46. If the page is in main memory, the real storage management will use the line address to transfer a line containing the missing instruction from the main memory 46 to the instruction cache 48. If the line containing the requested instruction is not in the main memory, the operating system will activate another storage management function, providing it with the identification of the page containing the needed line. Such a storage management function will send to the I/O adaptor 40 an address identifying the page containing the line. The I/O adaptor 40 will bring the page from auxiliary storage and provide it to the main memory 46. To make room for the fetched page, the storage management function selects a page in the main memory 46 to be replaced by the fetched page. In SCISM architecture, it is contemplated that the replaced page is returned to auxiliary storage through the I/O adaptor without compounding tag information. In this manner, those instructions most likely to be immediately required during execution of an instruction sequence are adjacent to the functional units in the instruction cache 48. The hierarchical memory organization provides the capability for fast retrieval of instructions that are required but not in the cache.

In the context of SCISM architecture, in-memory instruction compounding can be provided by an instruction compounding unit 70 which is located functionally between the I/O adaptor 40 and the main memory 46 so that compounding of the scalar instruction stream can take place at the input to, or in, the main memory 46. In this location, instructions can be compounded during an ongoing page fetch.

Alternatively, the instruction compounding unit can occupy the position 72 between the main memory 46 and the instruction cache 48 and compound instructions are formed line-by-line as they are fetched into the instruction cache 48, as may be considered a preferred embodiment.

Example of Compounding

The particular technique for compounding is a matter of design choice. However, for purposes of illustration, one technique for creating compound instructions formed from adjacent scalar instructions can be stated, as illustrated in the aforementioned In Memory Preprocessor application U.S. Ser. No. 07/543,458. By way of example, instructions may occupy 6 bytes (3 half words), 4 bytes (2 half words), or 2 bytes (1 half word) of text. For this example, the rule for compounding a set of instructions which includes variable instruction lengths provides that all instructions which are 2 bytes or 4 bytes long are compoundable with each other. That is, a 2 byte instruction is capable of parallel execution in this particular example with another 2 byte or another 4 byte instruction and a 4 byte instruction is capable of parallel execution with another 2 byte or another 4 byte instruction. The rule further provides that all instructions which are 6 bytes long are not compoundable. Thus, a 6 byte instruction is only capable of execution singly by itself. Of course, compounding is not limited to these exemplary rules, but can embrace a plurality of rules which define the criteria for parallel execution of existing instructions in a specific configuration for a given computer architecture.

The instruction set used for this example is taken from the System/370 architecture. By examining the OP code for each instruction, the length of each instruction can be determined from an instruction length code (ILC) in the op code. The instruction's type is further defined in other op code bits. Once the type and length of the instruction is determined, a compounding tag containing tag bits is then generated for that specific instruction to denote whether it is to be compounded with one or more other instructions for parallel execution, or to be executed singly by itself.

In the tag formal of this example (which is not limiting), if 2 adjacent instructions can be compounded, the tag bits, which are generated in memory, are "1" for the first compounded instruction and "zero" for the second compounded instruction. However, if the first and second instructions cannot be compounded, in this first tag format the tag bit for the first instruction is "zero" and the second and third instructions are then considered for compounding. Once an instruction byte stream has been processed in accordance with the chosen compounding technique and the compounding bits encoded for various scalar instructions, more optimum results for achieving parallel execution may be obtained by using a bigger window for looking at larger groups of instructions and then picking the best combination of N instructions for compounding.

Compounding Programs

Figure 4A:
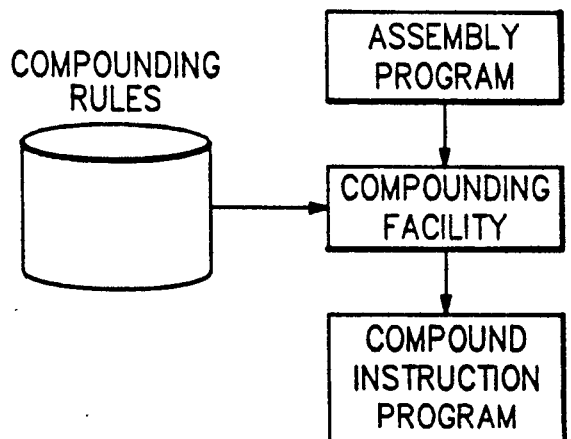
FIG. 4-A is a high level schematic diagram of the process which will be described pictorially for providing means for processing existing programs to identify sequences of instructions which can be executed as a single compound instruction in a computer designed to execute compound instructions, while FIG. 4-B illustrates the preferred operational environment of the inventions and the inventions' location in the environment.
Figure 4B:
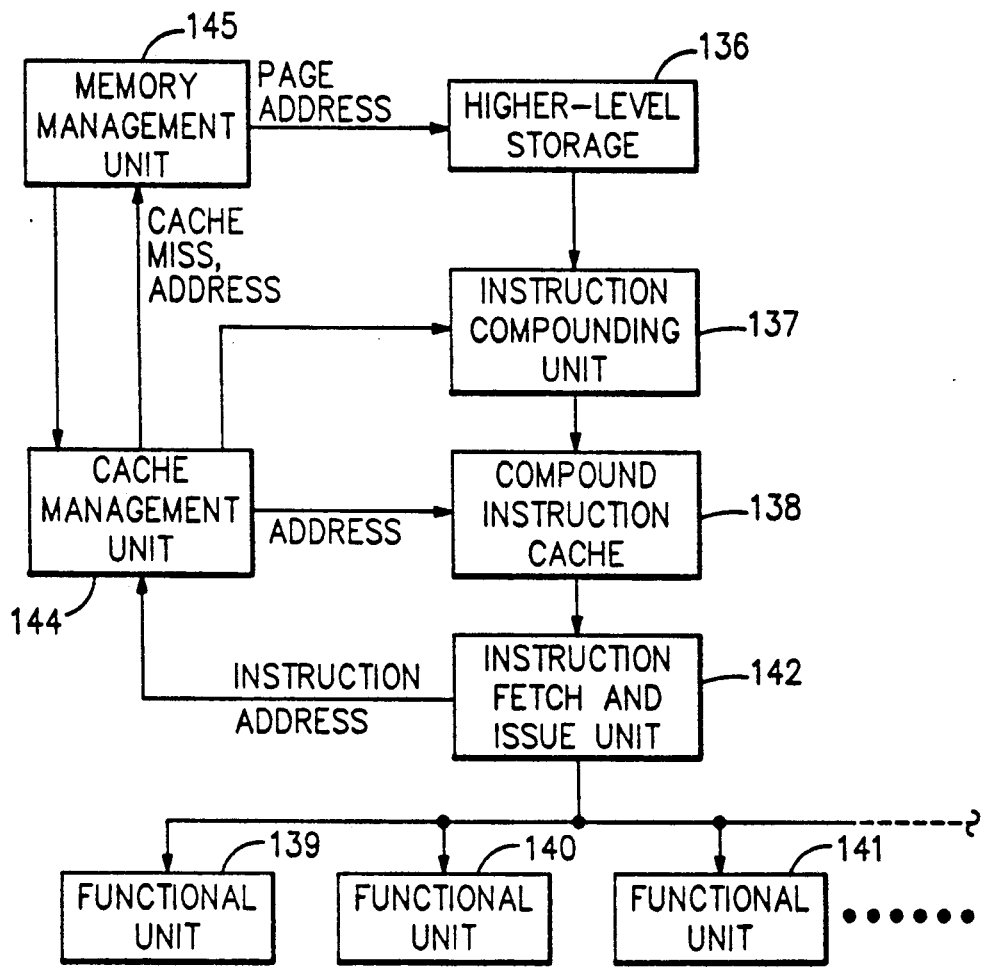

However, taking the above by way of example of the problem solved here, it may be considered that we have generally a need to provide the system and process illustrated generally by FIG. 4-A. Existing programs written in existing high level languages, as described with reference to FIG. 5, or existing assembly language programs to be processed, as described with reference to FIG. 6, need to be processed, and we have provided a system which has the capability to identify sequences of instructions which can be executed as a single compound instruction in a computer designed to execute compound instructions.

Turning now to FIG. 4-A, it will be seen that there is illustrated pictorially the sequence in which a program is provided as an input to a compounding facility that produces a compound instruction program based on a set of rules which reflect both the system and hardware architecture. The preferred compounding facility is illustrated by U.S. Ser. No. 07/642,011 filed Jan. 15, 1991. These rules are hereafter referred to as compounding rules. The program produced by the compounding facility can then be executed directly by a compound instruction execution engine generally illustrated by FIG. 7.

Figure 5:
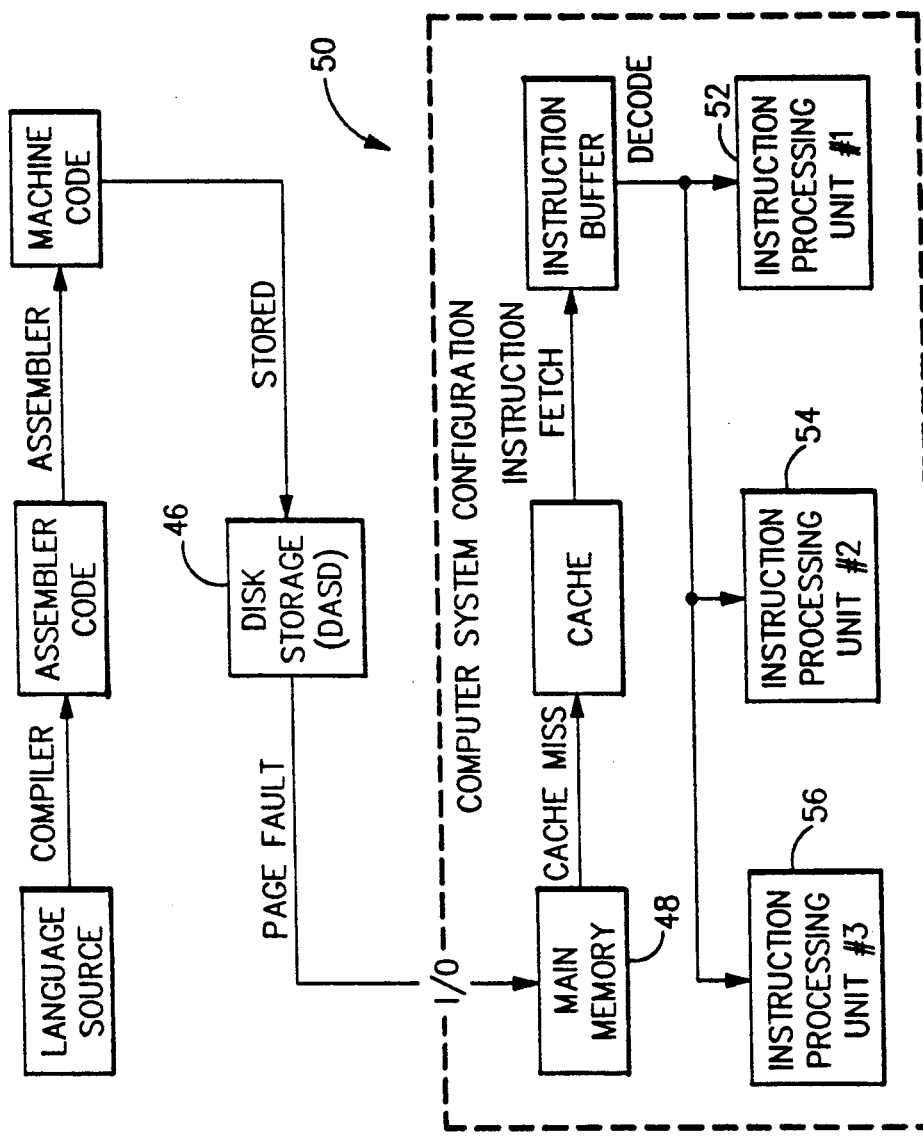
FIG. 5 shows a path taken by a program from original program code to actual execution.

However, FIG. 5 shows a typical path taken by a program from higher level source code to actual execution, and may also be considered as one of the possible organizations suggested by FIG. 4-A. An alternative related to assembly level programs is discussed with respect to FIG. 6.

As will have been appreciated, referring to FIG. 5, there are many possible locations in a computer system where compounding may occur, both in software and in hardware. Each has unique advantages and disadvantages. As shown in FIG. 5, there are various stages that a program typically takes from source code to actual execution. During the compilation phase, a source program is translated into machine code and stored on a disk 46. During the execution phase the program is read from the disk 46 and loaded into a main memory 48 of a particular computer system configuration 50 where the instructions are executed by appropriate instruction processing units 52, 54, 56. Compounding could take place anywhere along this path. In general as the compounding facility is located closer to an instruction processing unit (IPU), the time constraints become more stringent. As the compounding facility is located further from the IPU, more instructions can be examined in a large sized instruction stream window to determine the best grouping for compounding for increasing execution performance.

Compounding an Assembly-language Program

Figure 6:
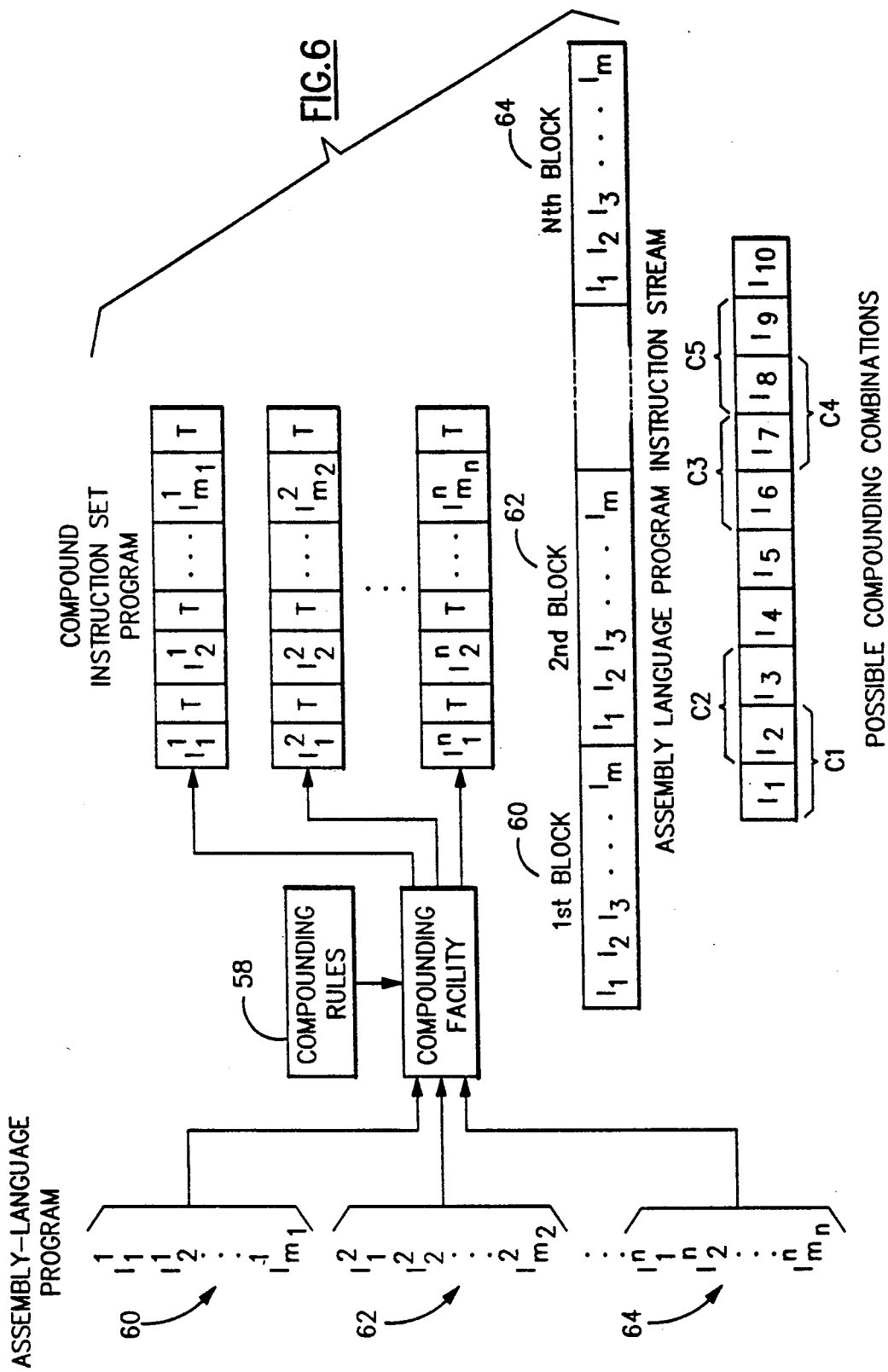

The flow diagram of FIG. 6 shows the generation of a compound instruction set program from an assembly language program in accordance with a set of customized compounding rules 58 which reflect both the system and hardware architecture. The assembly language program is provided as an input to a software compounding facility 59 which parses the program in m1-, m2-, ... $m_n$-instruction blocks (m=1,2, ... ) and produces the compound instruction program. Successive blocks of instructions are analyzed by the compounding facility 59. Blocks are numbered from 1 to n. Member instructions of block n are indicated by $1_m{}^n$, where m ranges from 1 up to the number of instructions in the block. The number of instructions in each block 60, 62, 64 in the byte stream which contains the group of instructions considered together for compounding depends on the design of the compounding facility and may vary from block to block.

As shown in FIG. 6, this particular compounding facility is designed to consider two-way compounding for "m" number of instructions in each block. The primary first step is to consider if the first and second instructions constitute a compoundable pair, and then if the second and third constitute a compoundable pair, and then if the third and fourth constitute a compoundable pair, all the way to the end of the block. Once the various possible compoundable pairs C1-C5 have been identified, the compounding facility can select the preferred of compounded instructions and use flags or identifier bits to identify the optimum grouping of compound instructions.

If there is no optimum grouping, all of the compoundable adjacent scalar instructions can be identified so that a branch to a target located amongst various compound instructions can exploit any of the compounded pairs which are encountered. Where multiple compounding units are available, multiple successive blocks in the instruction stream could be compounded at the same time.

Executing a Compounded Program

Figure 7:
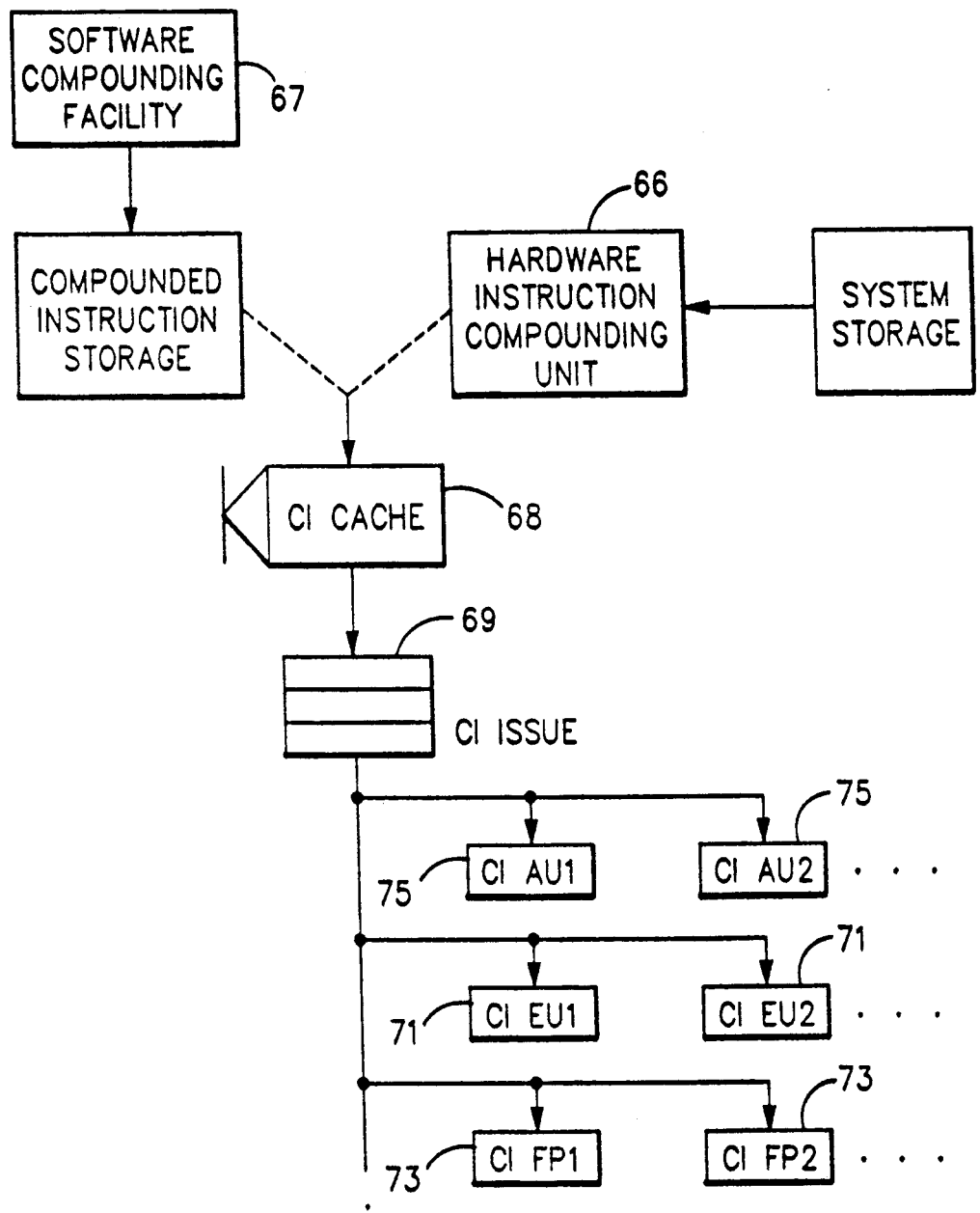
FIG. 7 is a flow diagram showing execution of a compound instruction set.

The flow diagram of FIG. 7 shows the execution of a compound instruction set program which has been generated by a hardware preprocessor 66 or a software preprocessor 67. A byte stream having compound instructions flows into a compound instruction (CI) cache 68 that serves as a storage buffer providing fast access to compound instructions. CI issue logic 69 fetches compound instructions from the CI Cache and issues their individual compounded instructions to the appropriate functional units for parallel execution.

It is to be emphasized that instruction execution units (CI EU) 71 such as ALU's in a compound instruction computer system are capable of executing either scalar instructions one at a time by themselves or alternatively compounded scalar instructions in parallel with other compounded scalar instructions. Also, such parallel execution can be done in different types of execution units such as ALU's, floating point (FP) units 73, storage address-generation units (AU) 75 or in a plurality of the same type of units (FP1, FP2, etc) in accordance with the computer architecture and the specific computer system configuration.

Control Information In Compounding

In the first tag format discussed in the aforementioned example, compounding information is added to the instruction stream as one bit for every two bytes of text (instructions and data).

In general, a tag containing control information can be added to each instruction in the compounded byte stream—that is, to each non-compounded scalar instruction as well as to each compounded scalar instruction included in a pair, triplet, or larger compounded group. As used herein, identifier bits refers to that part of the tag used specifically to identify and differentiate those compounded scalar instructions forming a compounded group from the remaining non-compounded scalar instructions which remain in the compound instruction program and that when fetched are executed singly.

Where more than two scalar instructions can be grouped together to form a compound instruction, additional identifier bits may be advantageous. The minimum number of identifier bits needed to indicate the specific number of scalar instructions actually compounded is the logarithm to the base 2 (rounded up to the nearest whole number) of the maximum number of scalar instructions that can be grouped to form a compound instruction. For example, if the maximum is two, then one identifier bit is needed for each compound instruction. If the maximum is three or four, then two identifier bits are needed for each compound instruction. If the maximum is five, six, seven or eight, then three identifier bits are needed for each compound instruction.

A second tag format, implementing this encoding scheme, is shown below in Table 1:

TABLE 1

| Identifier Bits | Encoded meaning | Total # Compounded |
| --- | --- | --- |
| 00 | This instructions not compounded with its following instruction | none |
| 01 | This instuction is compounded with its one following instruction | two |
| 10 | This instruction is compounded with its two following instructions | three |
| 11 | This instruction is compounded with its three following instructions | four |

Assuming instruction alignment is such that each halfword of text needs a tag, it can be appreciated that the IPU ignores all but the tag for the first instruction when an instruction stream is fetched for execution. In other words, a half word of fetched text is examined to determine if it begins a compound instruction by checking its identifier bits. In accordance with Table 1, if it is not the beginning of a compound instruction, its identifier bits are zero. If the half word is the beginning of a compound instruction containing two scalar instructions, the identifier bits are "1" for the first instruction and "0" for the second instruction. If the half word is the beginning of a compound instruction containing three scalar instructions, the identifier bits are "2" for the first instruction and "1" for the second instruction and "0" for the third instruction. In other words, the identifier bits for each half word identify whether or not this particular half word is the beginning of a compound instruction while at the same time indicating the number of instructions which make up the compounded group.

This method of encoding compound instructions assumes that if three instructions are compounded to form a triplet group, the second and third instructions are also compounded to form a pair group. In other words, if a branch to the second instruction in a triplet group occurs, the identifier bit "1" for the second instruction indicates that the second and third instruction will execute as a compounded pair in parallel, even though the first instruction in the triplet group was not executed.

It will be apparent to those skilled in the art that the present invention requires an instruction stream to be compounded only once for a particular computer system configuration, and thereafter any fetch of compounded instructions will also cause a fetch of the identifier bits associated therewith. This avoids the need for the inefficient last-minute determination and selection of certain scalar instructions for parallel execution that repeatedly occurs every time the same or different instructions are fetched for execution in the so-called super scalar machine.

Compounding Without Reference Points Between Instructions

It is straightforward to create compound instructions from an instruction stream if reference points are known that indicate where instructions begin. As used herein, a reference point means knowledge of which byte of text, which may contain instructions and/or data, is the first byte of an instruction. This knowledge could be obtained by some marking field or other indicator which provides information about the location of instruction boundaries. In many computer systems such a reference point is expressly known only by the compiler at compile time and only by the CPU when instructions are fetched. When compounding is done after compile time, a compiler could indicate with tags which bytes contain the first byte of an instruction and which contain data. This extra information results in a more efficient compounding facility since exact instruction locations are known. Of course, the compiler would differentiate between instructions and data in other ways in order to provide the compounding facility with specific information indicating instruction boundaries.

In a system with all 4-byte instructions aligned on a four byte boundary, one tag is associated with each four bytes of text. Similarly, if instructions can be aligned arbitrarily, a tag is needed for every byte of text. However, certain computer architectures allow instructions to be of variable length, and may further allow data and instructions to be intermixed, thus complicating the compounding process. Of course, at execution time, instruction boundaries must be known to allow proper execution. But since compounding is preferably done a sufficient time prior to instruction execution, a technique is needed to compound instructions without knowledge of where instructions start and without knowledge of which bytes are data. This technique needs to be applicable to all of the accepted types of architectures, including the RISC (Reduced Instruction Set Computers) architectures in which instructions are usually a constant length and are not intermixed with data. In connection with our invention, accomplishment of these tasks, which are generally described with reference to FIG. 4-A, is achieved with the assistance of a compound instruction execution engine of the kind generally described in U.S. Pat. No. 07/519,382 filed May 4, 1990 in an alternative environment.

Organization of Preferred System With Compounding Facility

Generally the preferred operating environment may be represented by the operational environment shown in FIG. 4-B. While the compounding facility may be a software entity, the preferred embodiment of the compounding facility may be implemented by an instruction compounding unit as described in detail in U.S. Pat. No. 07/642,011 filed Jan. 16, 1991. Referring to FIG. 4-B of the drawings, there is shown a representative embodiment of a portion of a digital computer system or digital data processing system constructed in accordance with the present invention with a cache management unit 144. This computer system is capable of processing two or more instructions in parallel. It includes a first storage mechanism for storing instructions and data to be processed in the form of a series of base instructions for a scalar machine. This storage mechanism is identified as higher-level storage 136. This storage (also "main memory") is a large capacity lower speed storage mechanism and may be, for example, a large capacity system storage unit or the lower portion of a comprehensive hierarchical storage system.

The computer system of FIG. 4-B also includes an instruction compounding facility or mechanism for receiving instructions from the higher level storage 136 and associating with these instructions compound information in the form of tags which indicate which of these instructions may be processed in parallel with one another. A suitable instruction compounding unit is represented by the instruction compounding unit 137. This instruction compounding unit 137 analyzes the incoming instructions for determining which ones may be processed in parallel. Furthermore, instruction compounding unit 137 produces for these analyzed instructions tag bits which indicate which instructions may be processed in parallel with one another and which ones may not be processed in parallel with one another but must be processed singly.

The FIG. 4-B system further includes a second storage mechanism coupled to the instruction compounding unit 137 for receiving and storing the analyzed instructions and their associated tag fields so that these stored compounded instructions may be fetched. This second or further storage mechanism is represented by compound instruction cache 138. The cache 138 is a smaller capacity, higher speed storage mechanism of the kind commonly used for improving the performance rate of a computer system by reducing the frequency of having to access the lower speed storage mechanism 136.

The FIG. 4-B system further includes a plurality of functional instruction processing units 139, 140, 141, et cetera. These functional units 139-141 operate in parallel with one another in a concurrent manner and each, on its own, is capable of processing one or more types of machine-level instructions. Examples of functional units which may be used are: a general purpose arithmetic and logic unit (ALU), an address generation type ALU, a data dependency collapsing ALU (of the preferred type shown in co-pending U.S. Ser. No. 07/504,910 filed Apr. 4, 1990), a branch instruction processing unit, a data shifter unit, a floating point processing unit, and so forth. A given computer system may include two or more or some of the possible functional units. For example, a given computer system may include two or more general purpose ALUs. Also, no given computer system need include each and every one of these different types of functional units. The particular configuration will depend on the nature of the particular computer system being considered.

The computer system of FIG. 4-B also includes an instruction fetch and issue mechanism coupled to compound instruction cache 138 for supplying adjacent instructions stored therein to different ones of the functional instruction processing units 139-141 when the instruction tag bits indicate that they may be processed in parallel. This mechanism also provides single instructions to individual functional units when their tag bits indicate parallel execution is not possible and they must be processed singly. This mechanism is represented by instruction fetch and issue unit 142. Fetch and issue unit 142 fetches instructions form the cache 138 and examines the tag bits and instruction operation code (opcode) fields, performing a decode function, and based upon such examinations and other such pipeline control signals as may be relevant, sends the instruction under consideration to the appropriate ones of the functional units 138-141.

In the context of SCISM architecture, in-cache instruction compounding is provided by the instruction compounding unit 137 so that compounding of each cache line can take place at the input to the compound instruction cache 138. Thus, as each cache line is fetched from the main memory 136 into the cache 138, the line is analyzed for compounding in the unit 137 and passed, with compounding information tag bits, for storage in the compound instruction cache 138.

Prior to caching, the line is compounded in the instruction compounding unit 137 which generates a set of tag bits. These tag bits may be appended directly to the instructions with which they are associated. Or they may be provided in parallel with the instructions themselves. In any case, the bits are provided for storage together with their line of instructions in the cache 138. As needed, the compounded instruction in the cache 138 is fetched together with its tag bit information by the instruction and issue unit 142. Instruction fetch and issue unit 142 and compound instruction cache 138 are designed such that a maximum length compound instruction (as defined by the system) may be fetched from compound instruction cache 138 and issued to the functional units 139, 140, 141, and so on. As instructions are received by the fetch and issue unit 142, their tag bits are examined to determine by decoding examination whether they may be processed in parallel and the opcode fields are examined to determine which of the available functional units is most appropriate for their processing. If the tag bits indicate that two or more of the instructions are suitable for processing in parallel, then they are sent to the appropriate ones in the functional units in accordance with the codings of their opcode fields. Such instructions are then processed concurrently with one another by their respective functional units.

When an instruction is encountered that is not suitable for parallel processing, it is sent to the appropriate functional unit as determined by its opcode and it is thereupon processed alone and singly by itself in the selected functional unit.

In the ideal case, where plural instructions are always being processed in parallel, the instruction execution rate of the computer system would be N times as great as for the case where instructions are executed one at a time, with N being the number of instructions in the groups which are being processed in parallel.

Further Control Information (Tag) in Compounding

As stated previously, the control field or tag contains information delimiting compound instruction boundaries, but may contain as much additional information as is deemed efficacious for a particular implementation.

For example, in a third tag format, a control field (tag) might be defined as an 8-bit field,

| $t_0 t_1 t_2 t_3 t_4 t_5 t_6 t_7$ with the bits defined as follows | |
|---|---|
| Bit | Function |
| $t_0$ | If 1, this instruction marks the beginning of a compound instruction. |
| $t_1$ | If 1, then execute two compound instructions in parallel |
| $t_2$ | If 1, then this compound instruction has more than one execution cycle. |
| $t_3$ | If 1, then suspend pipelining. |
| $t_4$ | If instruction is a branch, then if this bit is 1, the branch is predicted to be taken. |
| $t_5$ | If 1, then this instruction has a storage interlock from a previous compound instruction. |
| $t_6$ | If 1, then enable dynamic instruction issue. |
| $t_7$ | If 1, then this instruction uses an ALU. |

Classifying Instructions for Compounding

In general, the compounding facility will look for classes of instructions that may be executed in parallel, and ensure that no interlocks between members of a compound instruction exist that cannot be handled by the hardware. When compatible sequences of instructions are found, a compound instruction is created. For example, the System/370 architecture might be partitioned into the following classes:

1. RR-format loads, logicals, arithmetics, compares
  LCR—Load Complement
  LPR—Load Positive
  LNR—Load Negative
  LR—Load Register
  LTR—Load and Test
  NR—AND
  OR—OR
  XR—Exclusive OR
  AR—Add
  SR—Subtract
  ALR—Add Logical
  SLR—Subtract Logical
  CLR—Compare Logical
  CR—Compare
2. RS-format shifts (no storage access)
  SRL—Shift Right Logical
  SLL—Shift Left Logical
  SRA—Shift Right Arithmetic
  SLA—Shift Left Arithmetic
  SRDL—Shift Right Logical
  SLDL—Shift Left Logical
  SRDA—Shift Right Arithmetic
  SLDA—Shift Left Arithmetic
3. Branches—on count and index
  BCT—Branch on Count (RX-format)
  BCTR—Branch on Count (RR-format)
  BXH—Branch on Index High (RS-format)
  BXLE—Branch on Index Low (RS-format)
4. Branches—on condition
  BC—Branch on Condition (RX-format)
  BCR—Branch on Condition (RR-format)
5. Branches—and link
  BAL—Branch and Link (RX-format)
  BALR—Branch and Link (RR-format)
  BAS—Branch and Save (RX-format)
  BASR—Branch and Save (RR-format)
6. Stores
  STCM—Store Characters Under Mask (0–4-byte store, RS-format)
  MVI—Move Immediate (1 byte, SI-format)
  ST—Store (4 bytes)
  STC—Store Character (1 byte)
  STH—Store Half (2 bytes)
7. Loads
  LH—Load Half (2 bytes)
  L—Load (4 bytes)
8. LA—Load Address
9. RX-format arithmetics, logicals, inserts, compares
  A—Add
  AH—Add Half
  AL—Add Logical
  N—AND
  O—OR
  S—Subtract
  SH—Subtract Half
  SL—Subtract Logical
  X—Exclusive OR
  IC—Insert Character
  ICM—Insert Characters Under Mask (0-to 4-byte fetch)
  C—Compare
  CH—Compare Half
  CL—Compare Logical
  CLI—Compare Logical Immediate
  CLM—Compare Logical Character Under Mask
10. TM—Test Under Mask The rest of the System/370 instructions are not considered to be compounded for execution in this invention. This does not preclude them from being compounded on a future compound instruction execution engine.

One of the most common sequences in programs is to execute an instruction of the TM or RX-format compare class, the result of which is used to control the execution of a BRANCH-on-condition type instruction which immediately follows. Performance can be improved by executing the COMPARE and the BRANCH instructions in parallel, and this is sometimes done dynamically in high performance instruction processors. Some difficulty lies in quickly identifying all the various members of the COMPARE class of instructions and all the members of the BRANCH class of instructions in a typical architecture during the instruction decoding process. This difficulty is avoided by the invention, because the analysis of all the members of the classes are accomplished ahead of time and a compound instruction which is guaranteed to work is created.

Many classes of instructions may be executed in parallel, depending on how the hardware is designed. In addition to the COMPARE and BRANCH compound instruction described above, other compound instructions can be envisioned, such as LOADS and RR-format instructions, BRANCH and LOAD ADDRESS, etc. A compound instruction may even include multiple instructions from the same class, for example, RR-format arithmetic, if the processor has the necessary execution units.

Optimizing the Compounding of Instructions

In any realizable instruction processor, there will be an upper limit to the number of instructions that can comprise a compound instruction. This upper limit, m, must be specified to the compounding facility which is creating the executable instructions by generating compound instructions, so that it can generate compound instructions no longer than the maximum capability of the underlying hardware. Note that m is strictly a consequence of the hardware implementation; it does not limit the scope of instructions that may be analyzed for compounding in a given code sequence by the software. In general, the broader the scope of the analysis, the greater the parallelism achieved will be, as more advantageous compoundings are recognized by the compounding facility. To illustrate, consider the sequence:

X1; any compoundable instruction
X2; any compoundable instruction
LOAD R1, (X); load R1 from memory location X
ADD R3, R1; R3=R3+R1
SUB R1, R2; R1=R1−R2
COMP R1, R3; compare R1 with R3
X3; any compoundable instruction
X4; any compoundable instruction.

If the hardware-imposed upper limit on compounding is m=2, then there are a number of ways to compound this sequence of instructions depending on the scope of the compounding facility. If the scope were equal to four, then the compounding facility would produce the pairings <−X1> <X2 LOAD> <ADD SUB> <COMP X3> <X4−>, relieving completely the hazards between the LOAD and the ADD and the SUB and the COMP. On the other hand, a superscalar machine with m=2, which pairs instructions in its instruction issue logic on strictly a first-in-first-out basis, would produce the pairings<X1 X2> <LOAD ADD> <SUB COMP> <X3 X4>, incurring the full penalty of the interlocking instructions. Unfortunately, the LOAD and ADD cannot be executed in parallel because ADD requires the result of the load. Similarly, the SUB and COMP cannot execute in parallel. Thus no performance improvement is gained.

Branching and Compound Instructions

Figure 8:
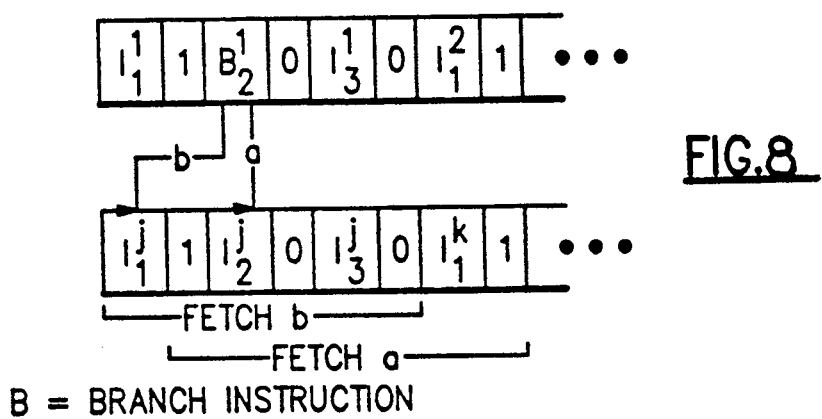
FIG. 8 illustrates a situation where a branch target may be at the beginning or middle of a compound instruction.

The systems described provide a method of generating a compound instruction program and further suggest a variety of methods for maintaining this association of compounding information (tags) with instruction text in a relatively permanent manner. But since there can be no guarantee that a branch into the middle of a compound instruction will not occur, what is not thus far apparent is how this compounding information can be maintained, and further, and more importantly, how correct program behavior can be maintained, in the presence of branches to arbitrary locations. This problem is in fact solved by instruction fetch and issue unit 142 of FIG. 4-B, as will be explained. First, assume a fourth definition of the compounding tag, T, such that T=1 if the associated instruction either begins a compound instruction or is an instruction to be executed singly. Further, T=0 for member instructions of a compound instruction other than the first. Then, assuming that instruction fetch and issue unit 142 can fetch a maximum-length compound instruction (as stated above), when fetching instructions in response to a taken branch, it always fetches a block of text equal to the maximum length compound instruction beginning at exactly the branch target address, and then executes all instructions fetched with T=0 as a compound instruction, up to the point in the fetched text where an instruction is encountered having T=1, indicating the beginning of the next compound instruction. If the T bit of the branch target is 1, then it is the beginning of a compound instruction and may be executed directly. FIG. 8 illustrates this situation. The notation used in FIG. 8 is $I_m^n$ where n is the compound instruction number, and m is the number of the instruction within compound instruction n. The allowable range for m is from 1 to the maximum length of a compound instruction, which, in this example, is assumed to be three. Instruction 2 of compound instruction 1 is a branch instruction, that, in this example, will have two possible target paths, "a" and "b". The "a" path branches to the middle ($I_2$) of compound instruction j, while the "b" path branches to the first instruction of compound instruction j. If the branch were to follow path "a", the hardware fetches the maximum length compound instruction, that is, three instructions, then executes $I_2^j$ and $I_3^j$ as a compound instruction. The remainder of the fetch, namely $I_1^k$ is recognized to be the beginning of either a new compound or single instruction (from its having T=1) and is held in reserve while the next block of text is is fetched for subsequent execution. If the branch instruction took the "b" path to the first instruction of compound instruction j, the hardware would again fetch a block of text equal in length to the maximum length compound instruction, yielding, in this case, a complete compound instruction, namely $I_1^j$ $I_2^j$ and $I_3^j$. Execution of that compound instruction proceeds directly.

This technique is equally applicable to other tag formats, such as the second tag format discussed above.

Note in FIG. 8 that branch instruction $B_2^1$ is compounded with the instructions following it, but since the branch is taken, the prefetched text following the branch, whether it is comprised of member units of the compound instruction containing the branch or subsequent single or compound instructions or in fact data (in systems that allowdata and instructions to intermix), cannot be allowed to update the machine state if correct program behavior is to be maintained. Further, fetching the target of a branch instruction may result in the fetching of a compound instruction containing a second branch that too can be followed by text that can not be allowed to update the machine state should the second branch be taken. This branch-to-branch sequence may continue ad infinitum. In both cases, the solution for maintaining correct program behavior is to prevent instructions that should not have been executed from updating the machine state. That is, the execution results of prefetched text sequentially following the taken branch must be nullified. Algorithmically, this may be stated as follows:

1. Begin the execution of the compound instruction, including any branch instruction within the compound instruction.

2. If the compound instruction does in fact contain a branch instruction, do not permit any instructions following the branch, be they in the same compound instruction as the branch, or in subsequent compound or single instructions, to update the machine state.

3. If the branch is taken, nullify the execution results of any instructions sequentially following the taken branch. Do not, however, nullify the execution of the branch target.

While we have described our inventions in their preferred embodiment and alternative embodiments, various modifications may be made, both now and in the future, as those skilled in the art will appreciate upon the understanding of our disclosed inventions. Such modifications and future improvements are to be understood to be intended to be within the scope of the appended claims which are to be construed to protect the rights of the inventors who first conceived of these inventions.

What is claimed is:

1. A system mechanism for processing instructions including compoundable instructions which are comprised of a group of member units up to a maximum of member units which can be executed after issue in parallel as a compound instruction in a machine having a plurality of functional units for processing instructions concurrently with branching into the middle of a compound instruction set of member units which may be executed together in parallel as an executable compound instruction, comprising, means for executing a branch instruction in one of the functional units; and means for fetching for decoding an instruction string text including one or more compound instruction having one or more member units which can be addressed by a branch target address for potential execution;

decoding means for decoding a compound instruction contained in fetched instruction string text, said compound instructions comprising a string sequence of instructions to be executed by the machine and including of member units of a compound instruction that have an instruction format including an opcode and control bits associated with the member unit's instruction, said control bits indicating whether the associated member unit can be executed in parallel with a subsequent member unit as an executable compound instruction; and wherein said decoding means examines the opcode and appended control bits in an instruction format of said compound instruction member units which are relevant to the execution of a compound instruction, and determines if a member unit of the text begins a compound instruction or are a subsequent portion of an executable compound instruction; and issuing means, responsive at least in part to the determination result of the decoding means, for issuing the member units of a compound instruction which includes a branch target addressed member unit to the functional units from a target addressed member unit at any sequential place in said string sequence to the end of the compound instruction containing the target addressed member unit for executing all of the member units of the executable compound instruction beginning with the target addressed member unit to a beginning member unit of a subsequent executable compound instruction so issued concurrently and maintaining the remainder of the text including the beginning member unit of a subsequent executable compound instruction for potential execution after the execution of the compound instruction has been initiated.

2. A system mechanism according to claim 1, wherein the issue means issues instructions to the functional units after said decoding means has made a determination whether a fetched member unit of the instruction string text begins a an executable compound instruction sequence; and further comprising, execution means within the functional units for executing said member units of an executable compound instruction sequence which includes a branch member unit; and nullifying means for nullifying any execution of a member unit of a compound instruction upon occurrence of possible conditions which would affect the correctness of results of execution of the said member unit of the compound instruction following a branch member unit or additional subsequent instructions containing a second branch member unit that is followed by text that cannot be allowed to update a machine state of the system mechanism should the second branch member unit be taken by issue to the functional units.

3. A system mechanism according to claim 1, wherein nullifying means are provided for nullifying the result of a member unit, and when said compound instruction includes a member unit that is a branch instruction which is able to be executed in parallel with another member unit of the compound instruction, then, if a branch is taken, said nullifying means nullifies the result of the member unit(s) following the branch taken so that the effect of the subsequent instruction is as if said nullified member unit(s) were not executed.

4. A system mechanism according to claim 1, where fetching means have been provided to fetch a complete compound instruction and wherein said decoding means causes execution of component member units of a compound instruction to start at an arbitrary point in the compound instruction as determined by branch execution and executes to the end of the compound instruction.

5. A system mechanism according to claim 1, wherein said decoding means detects the end of a compound instruction and causes the issuing means to maintain the remainder of the instruction text for later execution.

6. A system mechanism according to claim 1 wherein the compounding control bits for each one member unit instruction of the string of instructions, specifies, if the one instruction member unit may be executed in parallel with a subsequent instruction of the sequence of instructions as a compound instruction, or, specifies, if the instruction may not be executed in parallel with a preceding instruction member unit of the string of instructions, that the instruction must be executed as a single instruction.

7. A system mechanism according to claim 1 wherein the compounding control bits for each one member unit instruction of the string of instructions, specifies, if the one instruction member unit may be executed in parallel with a next instruction of the sequence of instructions as a compound instruction, or, the number of subsequent instructions with which the instruction can be executed, or which specifies, if the instruction may not be executed in parallel with a preceding instruction of the sequence of instruction, that the instruction must be executed as a single instruction.

8. A system mechanism according to claim 1 wherein the compounding control bits for each one member unit instruction of the string of instructions, specifies, if the one instruction may be executed in parallel with a subsequent instruction of the sequence of instructions, or, specifies, if the instruction may not be executed in parallel with a preceding instruction of the sequence of instruction, that the instruction must be executed as a single instruction.

9. A system mechanism according to claim 2, wherein the compound instruction is a multimember compound instruction and one of said member units of the compound instruction is a branch followed by at least a second member unit, and wherein during execution if a branch is taken the execution results of the second member unit following the branch are nullified.

10. A system mechanism according to claim 2, wherein if a second member unit of a compound instruction after a branch appears to be an instruction, and such said second member unit could begin to be executed as if it were an instruction, the nullifying means nullifies the execution of the second member unit of a compound instruction after a branch.

11. A system mechanism according to claim 2 wherein the compounding control bits for each one member unit instruction of the string of instructions, specifies, if the one instruction member unit may be executed in parallel with a subsequent instruction of the sequence of instructions as a compound instruction, or, specifies, if the instruction may not be executed in parallel with a preceding instruction member unit of the string of instructions, that the instruction must be executed as a single instruction.

12. A system mechanism according to claim 2 wherein the compounding control bits for each one member unit instruction of the string of instructions, specifies, if the one instruction member unit may be executed in parallel with a next instruction of the sequence of instructions as a compound instruction, or, the number of subsequent instructions with which the instruction can be executed, or which specifies, if the instruction may not be executed in parallel with a preceding instruction of the sequence of instruction, that the instruction must be executed as a single instruction.

13. A system mechanism according to claim 2 wherein the compounding control bits for each one member unit instruction of the string specifies, if the one instruction may be executed in parallel with a next one instruction of the sequence of instructions, the number of subsequent instructions with which the instruction can be executed, or which specifies, if the instruction may not be executed in parallel with a preceding instruction of the sequence of instruction, that the instruction must be executed as a single instruction.

* * * * *